L. P. STONE.
DIRECTION INDICATOR.
APPLICATION FILED FEB. 7, 1919.

1,366,846.

Patented Jan. 25, 1921.

Inventor
L. P. Stone

By G. Hume Talbert, Attorney

UNITED STATES PATENT OFFICE.

LAWRENCE P. STONE, OF NEWARK, OHIO.

DIRECTION-INDICATOR.

1,366,846.    Specification of Letters Patent.    Patented Jan. 25, 1921.

Application filed February 7, 1919. Serial No. 275,590.

*To all whom it may concern:*

Be it known that LAWRENCE P. STONE, a citizen of the United States of America, residing at Newark in the county of Licking and State of Ohio, has invented new and useful Improvements in Direction - Indicators, of which the following is a specification.

The object of the invention is to provide a device for mounting on auto vehicles adjacent to wind-shield whereby the driver of a particular vehicle may indicate to those in his rear and also to those in front including the traffic officer the direction he intends taking. To this end the invention comprises a casing for positioning transversely across the vehicle behind or in front of the wind-shield. This casing carries a signal element longitudinally movable therein so that it may be caused to project from one end or the other of said casing for the purpose of effecting the signal in operation. Its movement is effected by means of a handle and geared connections between the handle and said element whereby the movement of the handle may cause the said element to be extended from one end or the other of the casing for the useful purpose above stated.

To the exact construction in which it is shown and described, the invention is not to be restricted. The applicant reserves the right to make such changes or alterations as the actual reduction to practice may suggest, in so far as such changes or alterations are compatible in spirit with the annexed claim.

The same numerals of reference designate the same parts throughout the several figures of the drawing, herein:

Figure 1:
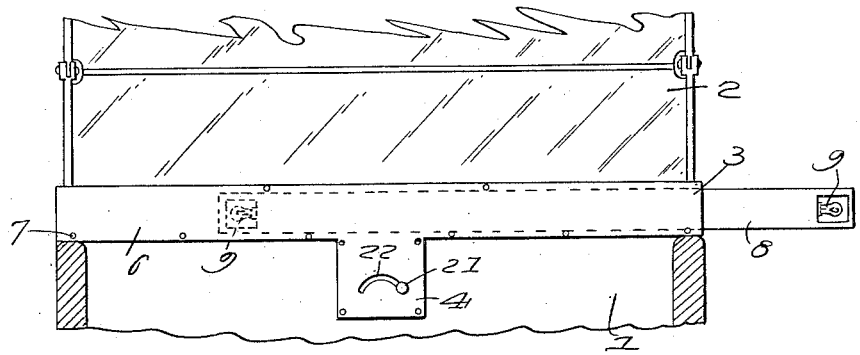
Figure 1 is a view looking at the front dash and wind-shield of an auto vehicle, the improved device shown mounted thereon and appearing in side elevation.
Figure 2:
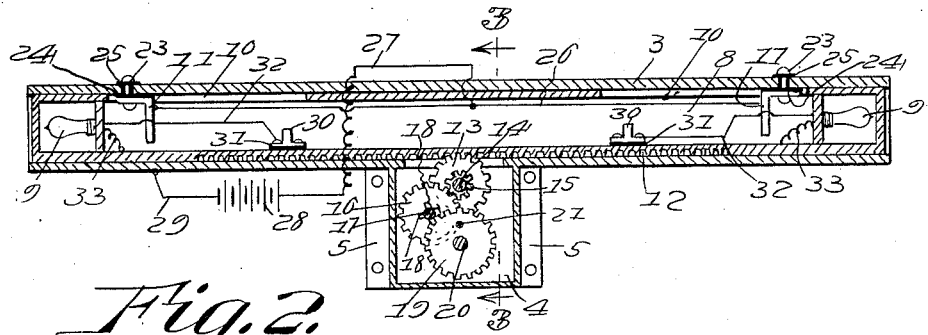
Fig. 2 is a longitudinal sectional view through the device *per se.*
Figure 3:
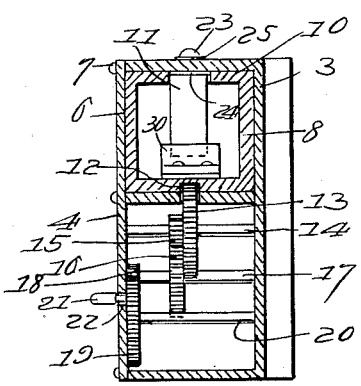
Fig. 3 is a central vertical sectional view on the line 3—3 of Fig. 2.

As shown the invention is designed preferably for mounting on the dash 1 of an auto vehicle which as is usual is provided with a wind-shield 2. The indicator comprises a longitudinal casing 3 which is preferably square in cross section and which is open at either end. This casing is formed with a central depending section 4 which is hollow and which on its forward face has connected to it the brackets 5 by means of which the whole is attached to the dash 1. In the rear or on that side facing the driver of the vehicle, the casing 3 and its dependent section are closed by the removable cover 6 which is secured in place by means of appropriate fasteners or screws 7.

Mounted for sliding movement in the casing 3 there is a hollow signal element 8 which at either end carries a light 9. This element 8 is of slightly less length than the casing 3 so that both it and the lights which project from both ends may be inclosed entirely within the casing except when the said element is projected from one end or the other of said casing. The signaling element 8 is of hollow construction and its top wall is formed with a longitudinal slot 10, this slot forming a clearing space for contact members 11 as the signaling element is moved longitudinally through the casing 3.

On the bottom face of the bottom wall, the signaling element is provided with a plurality of rack-teeth 12 and these rack-teeth mesh with a gear 13 carried on a pintle 14 in common with a pinion 15. This pintle or shaft 14 is journaled in the forward wall of the depending section 4 and in that part of the cover 6 which closes the said depending section. Meshing with the pinion 15 there is a gear 16 and this gear is carried on a shaft 17 which is rotatably mounted in both the cover 6 and the forward wall of the depending section 4. The shaft 17 also carries a pinion 18 and this latter is in mesh with a gear 19 mounted on a spindle or shaft 20, the latter being journaled as are the shafts 17 and 14. The shaft 20 is substantially a rock shaft, supporting the gear 19 for the rocking of the latter which is effected by means of a handle 21 projecting through and movable from one extremity to another of an arcuate slot 22 formed in that part of the cover 6 which closes the depending section 4. It will be observed that the movement of the handle 21 to the right-hand end of the slot 22 will result, because of the connections just described, in a longitudinal movement of the signaling element 8 longitudinally a right-hand direction through the casing 3, the gear ratio being such that when the handle 21 abuts the right-hand end of the slot 22, the end of the signaling element will be projected from the right-hand end of the casing 3. Similarly the movement of the handle 21 to the left-hand end of the slot 22 will result in projecting the left-hand end of the signaling element 8 from the left-hand end of the casing 3. The position of the handle 21 at the intermediate point in the slot 22 will bring the signaling element and its lamps within the ends of the casing 3.

Aside from effecting such movement of the signaling element, it is the purpose to illuminate the signal lights 9 when the signaling element is extended its proper distance and to this end the contact members 11 are provided, these being secured to the upper wall of the casing 3 by appropriate fastening means 23 and being insulated from said upper wall by appropriate insulation 24, the fasteners also being insulated from the upper wall as indicated at 25. It will be observed that there are two contact elements 11 both of which are spaced a definite distance to either side of the longitudinal center of the casing 3 but these two contact members are electrically connected by a wire or rod 26 to which there is led through the top of the casing a conducting wire 27. This conducting wire 27 connects with one terminal of the battery 28 whose upper terminal is connected with the casing 3 or some metallic part of the structure of the device by means of a conducting wire 29.

Coöperating with these contact members 11 there is a contact member 30. This is carried within the signaling element 8 and is mounted on the bottom wall of the latter, being insulated therefrom by the strip 31. One terminal of each light 9 is electrically connected to the contact member 30 by the wire 32, the other terminal of each light being connected with the metallic body of the signaling element by means of the wire 33. As the signaling element is moved longitudinally through the casing 3, the contact 30 connects with either one or the other of the contact members 11 when the signaling element reaches its extreme projecting position. In such a position therefore the light 9 on the projecting end of the signaling element is illuminated by current derived from the battery 28, this current passing from the battery over the wire 29 to the casing 3, thence to the signaling element 8, thence over the wire 33, thence through the lamp filament, thence over the wire 32 to the contact 30, thence to the contact 11 and thence over the wires 26 and 27 back to the battery. Of course when the signaling element is positioned so that it stands entirely within the casing 3, the contact 30 stands between the two contacts 11 with neither of which it connects, and the circuit on the battery is therefore broken at this point with the result that both lights are deprived of current.

From the foregoing description and the accompanying drawing, it is believed that a clear enough understanding of the invention is to be had to render further description unnecessary.

The invention having been described what is claimed new and useful is:—

A direction indicator comprising a long hollow casing for mounting on an auto vehicle with its length in the direction of the width of the vehicle, the said casing being open at its ends formed with a central depending hollow section, a signaling element slidably mounted in said casing and carrying signaling means at its ends, the outer face of the bottom wall of said signaling element being formed with rack teeth, a rock shaft mounted in said depending section, a gear carried by said rock shaft, a handle carried by said gear and projecting through an arcuate slot formed in said section, and intermediate gears connecting the first said gear with the said rack teeth, whereby the movement of said handle from one end of the said slot to the other will effect the longitudinal movement of the signaling element for the useful purpose specified.

In testimony whereof I affix my signature.

LAWRENCE P. STONE.